UNITED STATES PATENT OFFICE

JULIAN C. SMITH AND HARRY T. BELLAMY, OF CHICAGO, ILLINOIS; SAID SMITH ASSIGNOR, BY MESNE ASSIGNMENTS, TO SAID BELLAMY

MANUFACTURE OF POROUS STRUCTURES

No Drawing.  Application filed April 12, 1928. Serial No. 269,599.

The present invention relates generally to the manufacture of porous material for insulation purposes such as brick, blocks, slabs, and other forms.

It has particular reference to mineral substance such as hydraulic cements, gypsum, clays, etc., which have an inherent quality for setting, with special reference to clays or other bonded mixtures of various substances. The invention is especially adapted to the manufacture of heat treated products such as fire brick of a porous character from clay. Articles manufactured according to the present invention are characterized by great strength, unruptured cell partitions, uniformity of porosity, predetermined size of pores, and low through-pore space.

Although the manufacture of porous materials by the use of kieselguhr as the basic substance is old, the present invention may be applied in the manufacture of brick and the like from raw material which is essentially kieselguhr in order to form discrete pores distinct from the inherent pores of kieselguhr.

The incorporation of combustible material into brick forming mixtures for subsequent burning to form pores is disadvantageous. This is in part due to the necessary burning and in part to the forced liberation of gases from within the brick which tends to disrupt and weaken the structure. Gases must penetrate the brick and thereafter be emitted in order to effect complete removal of combustible carbonized matter. Some combustible material heretofore employed absorbs water from the mix and this introduces forming and drying difficulties which may affect the strength of the article. The use of soluble substance also has certain disadvantages in commercial use as removal must be effected by penetration of a solvent followed by removal of both solvent and solute.

The primary object of the present invention is the use of a volatile solid as a component of a mix and to evaporate the substance at such time as the material has acquired a self-supporting structure.

A great variety of volatile agents are available but of course all are not practical. There are insoluble and soluble agents which may be considered having various degrees of solubility. Both organic and inorganic materials are available. For example, ammonium carbonate is a soluble volatile substance. This may be employed within the broadest aspect of the invention using a saturated solution so that solid particles of the volatile material may be present in the mix.

In the preferred aspect of the invention a substantially insoluble agent is employed in order to eliminate crystal growth by the removal of water content faster than volatile content, and also to prevent chemical or physically effects of a solution of such material. Such crystal growth tends to disrupt structure.

It is therefore another object of the invention to use a volatile substance characterized by a low solubility in water.

When a volatile substance is employed which can be melted a particular feature of the invention is the use of one with a high vapor pressure in solid form below its melting point, or more specifically, one which readily sublimes, like naphthalene.

Still another object of the invention is the use of a material which will volatilize from the solid state simultaneously with the evaporation of water from the mix.

Another object is the use of a substance which if it does melt will remain solid at a temperature suitable for rapid evaporation of water.

Still another object is the use of a crude volatile substance which may be purified by the removal process and thereafter be recovered as a higher grade product.

Another object is the use of a mixture of materials which contributes to the purification of volatile substance employed.

Still another object is the use of a volatile substance which can be readily converted into particles having a more or less predetermined size or shape in order to control the character of the resulting porosity.

Various other objects and advantages of the invention will be apparent from the ensuing description given by way of exemplifying the invention as it is more specifically applied to the making of fire brick using naphthalene as a representative volatile agent capable of attaining the foregoing objects.

The following example is given merely as an illustration of one manner of carrying the invention into practice in making a commercial brick, slab, or other form of great strength and also for effecting purification of the pore-forming material. The specific proportions and materials herein set forth are given as a basis for explaining the various features of the invention.

A mixture containing:

|  | Per cent |
| --- | --- |
| Naphthalene | 58 |
| Bonding clay | 38 |
| Kieselguhr | 4 | is wetted with sufficient water to form a plastic mix capable of formation into bricks, slabs, tile, tubing, etc., in any manner well understood in the art.

As naphthalene we employ a crude product but may employ a higher grade or a pure product if desired. Crude naphthalene coming from centrifugal separators contains an oil impurity. We desire to absorb this oil by employing a suitable absorbing agent in the mix. The kieselguhr performs this function. Using purer naphthalene will permit using less or no kieselguhr. Although kieselguhr, as the basic material in bricks and the like, forms products having low strength and refractory powers, we find on one hand that the quantities we used do not materially affect the product in these regards, while on the other hand the quantity employed seems to improve the insulating qualities.

As a bonding clay we prefer one which has a good dispersion with maximum dry strength, maximum fired strength at a maturing temperature of cone 7 to 9, and high refractoriness with softening point over 3000° F.

When the desired article is formed as by a mold or other means it is dried at a temperature sufficiently under 80° C. to prevent melting of the naphthalene, under conditions permitting sublimation of naphthalene. The dry brick freed from naphthalene may be fired in the usual manner.

As the material drys in a current of air, or by withdrawal of vapors, the naphthalene may be condensed to form flakes of a very pure grade of naphthalene. This may be accomplished by passing the vapors into a closed chamber from which the purified naphthalene may be collected.

As regards the purification feature of the process exemplified by naphthalene we have ascertained that a crude naphthalene melting from 71° to 75° C. gives a product melting at 79.7° C. Pure naphthalene flakes as procured in the market melt at 79.7° C. It is thus evident that the process is capable of providing a marketable grade of naphthalene directly from crude material in a single step. Other tests on the product compare favorably with tests on commercial products.

In using naphthalene according to the present invention we determine the porosity by proportioning the naphthalene to the other solid material. For other porous structures we may go as high as 75% in naphthalene, forming a material which may be quite fragile and we may go as low as 25% to form a slightly porous material. However, these figures are not to be construed as limitations of the invention. We may use flakes of naphthalene and form flat cellular spaces or we may use a ground fused naphthalene of predetermined mesh to control the size of pores.

Nor do we limit ourselves to substances which are to be fired. We have produced good products from naphthalene and plaster of Paris. We have used naphthalene and inert material bonded with sodium silicate. As inert material we may employ ground porous products bonded with hydrated lime, or other materials capable of setting to a monolithic mass. Various other modifications and materials will be apparent to those skilled in the art.

Although it is more practical to use water with such materials to form a plastic mass, it is contemplated that dry or non-plastic mixes may be employed and pressure molding or other shaping steps be resorted to as desired, using any suitable material for a plasticizer.

Napthalene has a slight solubility in water but in solution it is non-reactive and appears to have no detrimental effects on the physical characteristics of the mix. This low solubility and high volatility prevent any disturbing condition by evaporation of water to grow naphthalene crystals. The melting point of pure naphthalene is about 80° C. and its vapor pressure near this temperature is very high so that it readily sublimes simultaneously with the evaporation of water from the mix. As the water evaporates it leaves the mineral constituents in a self-supporting form so that the removal of naphthalene, if it has not been completely effected at the time the water is removed, does not weaken the supporting webs between the pores. The evolution of water and naphthalene vapors is not forced so there is no disturbing effect of escaping gas. As naphthalene and water disappear from the surface inwardly it follows that a shell of self-supporting structure is formed at a time when an interior supporting structure has not been effected. Consequently it is important that the naphthalene at the interior be held in solid form to maintain the compactness of the mix. Throughout the whole drying operation it is therefore an important feature that the naphthalene is maintained below its melting point until sufficient water is removed to give the desired self-sustaining structure.

It is a further advantage that the naphthalene and the water vapor are removed together since the vapor of one material aids in the evaporation of the other by preventing complete saturation of the surrounding medium by any one vapor.

In the evaporation process the oil and the higher melting impurities are left in the article, the oil especially being readily absorbed by the kieselguhr.

In the higher heat treatment given to the dried porous mass as in the firing of fire brick, there is a shrinkage which amounts to about 15% for fire brick made according to the example herein given. This shrinkage doubtless closes many pores throughout the mass forming a brick with low through-pore space. Such a condition is not readily effected in using pore-forming material which must be removed by burning it out. The naphthalene can be removed at low temperatures before such shrinkage is appreciable and before the smallest pores are closed by shrinkage; and the removal of naphthalene can be accomplished without physical disturbance of the mass as for example by motion, treatment with solvents, etc.

When the material is fired to form a fire brick the product has a very high water absorbing capacity taking up from (60 to 80%) its weight of water.

In general the product of the process particularly described herein and of the proportions herein stated has sufficient strength to permit it to be made up into slabs, tile, etc., of considerably larger sizes than are now made up of refractory insulating material appearing on the market. The well known porous products on the market today are so limited in strength that the size of article is limited for general usage. We have found that our product permits making desirable articles for general usage in considerably larger sizes than others are able to provide at the present time.

We believe that the great strength may be attributed to the process and to the use of material having the characteristics of naphthalene. The non-absorbing character of naphthalene toward water and the discrete form of its particles make discrete pores. The retention of the particle in the pore until the cell walls surrounding it are self-supporting and the gentle liberation of the vapor without other disturbances such as solvents, combustion, melting, and the like, are also believed to be important contributing factors. It is furthermore important that the naphthalene remains solid and yet sublimes readily at a temperature which is a very good drying temperature.

The fired product especially is a fine grained porous product of great strength, of uniform texture, and of homogeneous structure, with a specific gravity of about 0.64. It is capable of mechanical working, such as turning, planing, sawing, and abrasion without chipping. For this reason any desirable form may be machined from a mass. Bricks and forms which shrink or are deformed in firing may be trued to dimensions.

The mass is an excellent absorber for gases or liquids. Its porosity also renders it useful as a sound absorbent tile or covering. Using a suitable base, such as plaster or gypsum, and employing naphthalene or other suitable volatile agent permits the use of the invention for coating walls, ceilings and the like with a sound absorbent plaster. Closed closets may be so plastered under conditions which prevent escape of volatile agent, so that a plaster mass embodying it is maintained for moth repellant purposes. Naphthalene and para-dichlorobenzene are each suitable for such purposes and are each volatile at ordinary temperatures from the solid state. Therefore, they are capable of forming porous structures within the contemplation of this invention. Closets so plastered will of course lose the volatile agent in the course of time and become porous. The walls may then be reloaded by applying the suitable moth repellants such as naphthalene or para-dichlorobenzene to be absorbed by the pores, either in melted form or in suitable carrying solvents.

The fired product especially has such strength, uniformity, texture, and surface characteristics that it lends itself to uses not heretofore practical with other porous insulating structures, such as the lining of bank vaults and the like, stack insulation in buildings wherein a plaster coat may be readily carried by the brick, ornamental walls for rooms, passageways, auditoriums, etc.

In the latter use above mentioned the structure in slab, tile, molded or machined forms, adapts it to architectural ornamentation. At the same time it functions as a sound absorber and heat insulator. The uniformity and surface texture permits surface ornamentation. Grained structures may be made. Colored ingredients may be fired in the structure, or dyestuffs afterward applied to the fired structure. The surface can be metallized into a beautiful finish, using metal bronzes, plated metal, sprayed metal by the Schoop process, etc. Enamels may be fired in or dried on, as well as other coatings such as waterproofing agents, paints, lacquers, etc., to give any desired appearance. The metallizing of the surface has been found very beneficial in increasing its thermal resistance, as a considerable portion of incident heat radiation may be reflected, thus decreasing the amount to be transmitted.

In the practice of the present invention we do not intend to be limited to the specific disclosure herein made. The process is subject to changes of plasticizers, volatile agents, minerals, proportions, temperatures, treatment, etc., in any manner within the scope of the appended claims.

We claim:

1. The method of refining crude solid material which is volatile below the boiling point of water which comprises mixing particles of said crude material with a mixture capable of setting to form a monolithic mass, including in the mass an agent capable of absorbing impurities in said crude material, permitting the mix to set into a self-sustaining structure, and volatilizing said material from said structure below the boiling point of water.

2. The method of refining crude solid material which is volatile below the boiling point of water which comprises mixing particles of said crude material with a mixture capable of bonding to form a self-sustaining mass, including in the mass an agent capable of absorbing impurities in said crude material, permitting the mix to set into a self-sustaining structure, and volatilizing and collecting said material from the said structure below the boiling point of water.

3. In the making of porous brick, slab, and the like, the steps which comprise mixing with water to form a plastic mass particles of naphthalene, kieselguhr, and a bonding clay, molding the mass, drying to a self-sustaining structure at a temperature under the melting point of the naphthalene, and simultaneously with the drying removing naphthalene from the structure at a temperature below the melting point of the naphthalene.

4. The method of making fire brick which comprises mixing with water to form a plastic mass, 38% bonding clay, 58% naphthalene, 4% kieselguhr, molding the mass, removing water and naphthalene vapors at a temperature below the melting point of the naphthalene until a self-sustaining structure is formed, thereafter further drying, and then heating at a firing temperature.

5. The method of refining crude naphthalene which comprises utilizing particles of crude naphthalene as a pore-forming ingredient in a mixture of materials including earthy materials and an agent capable of absorbing the impurities in the naphthalene, and subliming naphthalene from the mix without melting the naphthalene.

6. The method of refining crude volatile solid material which comprises mixing particles of crude naphthalene with a mixture capable of setting to form a monolithic mass, including in the mass an agent capable of absorbing impurities in said crude material, permitting the mix to set into a self-sustaining structure, and volatilizing naphthalene from said structure without melting the naphthalene.

In witness whereof we have hereunto affixed our signatures.

JULIAN C. SMITH.
HARRY T. BELLAMY.